Aug. 21, 1951 H. WEINGARDEN 2,565,334

ANTENNA SETTING DEVICE

Filed June 9, 1949 3 Sheets-Sheet 1

INVENTOR.
HERBERT WEINGARDEN

BY Robert A. Sloman
ATTORNEY.

INVENTOR.
HERBERT WEINGARDEN.
BY
Robert A. Sloman
ATTORNEY.

Aug. 21, 1951 H. WEINGARDEN 2,565,334

ANTENNA SETTING DEVICE

Filed June 9, 1949 3 Sheets-Sheet 3

INVENTOR.
HERBERT WEINGARDEN.
BY Robert A. Sloman
ATTORNEY.

Patented Aug. 21, 1951

2,565,334

UNITED STATES PATENT OFFICE 2,565,334

ANTENNA SETTING DEVICE

Herbert Weingarden, Detroit, Mich.

Application June 9, 1949, Serial No. 98,056

9 Claims. (Cl. 343—100)

This invention relates to the antenna for a television receiver, and more particularly to a device for properly adjusting the rotated position of the antenna to obtain the best and clearest reception from a particular television wave channel.

Heretofore in present television receivers the antenna had to be set manually by climbing on the roof of the building rotating manually the antenna and its supporting shaft while a second person energized the television set to a particular channel and watched the view screen. The party watching the view screen would signal the man on the roof when the image wa. the clearest for the strongest television wave panel. The man on the roof would have set the antenna substantially at right angles to the direction of waves from the broadcasting station.

As the various television broadcasting stations are arranged geographically at different points it is apparent that the setting of the antenna for one station would not be completely satisfactory for other stations. It is possible that the reception from certain television wave channels would be satisfactory while with others the reception would be poor in view of the improper angularity of the antenna with respect to the source of television waves.

It is the object of the present invention to provide a mechanism in conjunction with the television receiver and its view screen which entirely eliminates the necessity of going upon the roof to adjust the antenna to the proper position.

It is the object of the present invention to provide a remote control for the antenna supporting shaft whereby the same may be mechanically rotated to the desired position for any particular wave channel which is selected for reception.

It is the object of the present invention to provide means for rotating the antenna to the proper position for each of the various television wave channels, it being contemplated that said antenna be rotatably adjusted every time a different channel is selected to obtain clear reception for all channels.

It is the further object of this invention to provide an electric motor which is coupled to the antenna supporting shaft together with a remote switch on or adjacent to the television receiver whereby with a particular channel selected, the antenna supporting shaft may be rotated and stopped when the image on the view screen is the clearest.

It is the further object of this invention to provide automatic controls for the electric motor to automatically stop the same after the antenna supporting shaft has been rotated to a predetermined position.

It is the further object of this invention to provide a setting mechanism whereby said controls corresponding to the various wave channels may be preset so as to stop rotation of the antenna supporting shaft at positions where the image on the view screen is the clearest for each of said wave channels. Once the setting mechanism has been properly adjusted, thereafter it will operate automatically to regulate the rotation of the antenna support to attain the proper positioning of the antenna for any channel selected.

These and other objects will be seen from the following specification and claims in conjunction with the appended drawings in which:

It will be understood that the above drawings illustrate merely a preferred embodiment of the invention and that other embodiments are contemplated within the scope of the claims hereafter set out.

Figures 1, 2, 3:
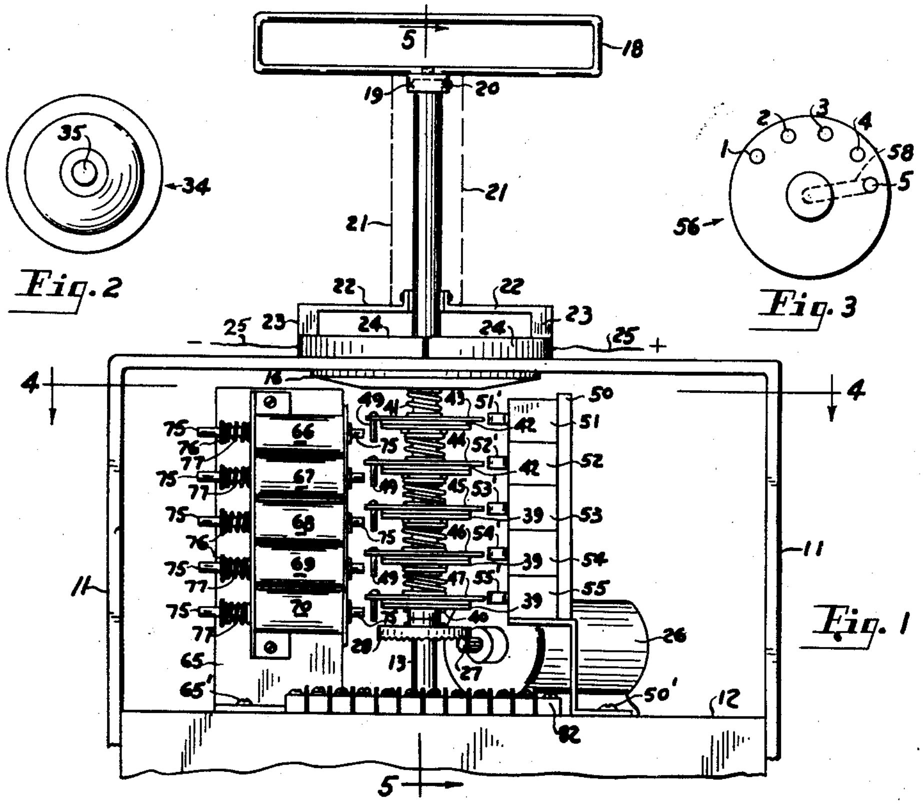
Fig. 1 is a partially fragmentary elevational view of the device embodying the present invention.
Fig. 2 is a plan view of the manually controlled setting switch.
Fig. 3 is a plan view of the channel switch employed.
Figure 4:
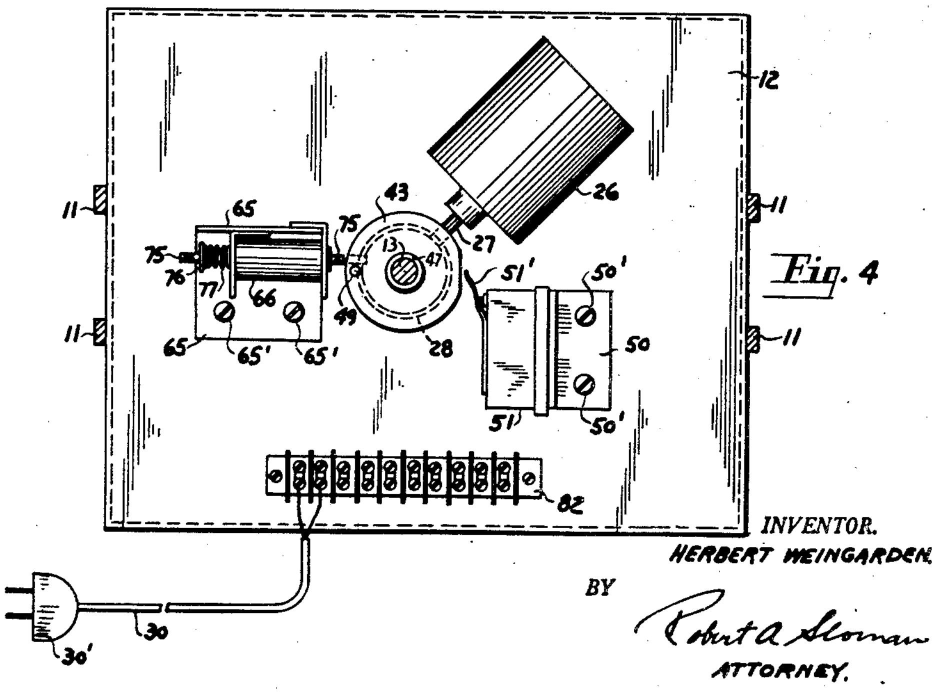
Fig. 4 is a plan section taken on line 4—4 of Fig. 1.
Figure 5:
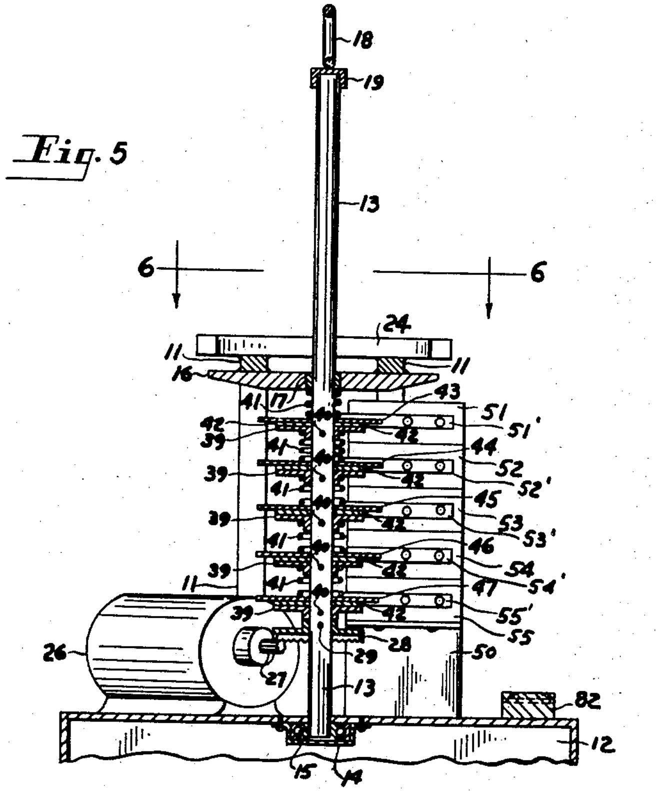
Fig. 5 is an elevational section taken on line 5—5 of Figure 1.
Figure 6:
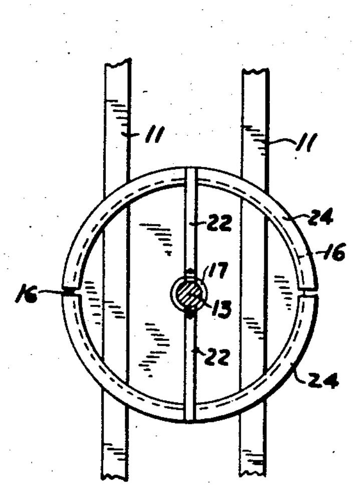
Fig. 6 is a plan section of a portion of the device taken on line 6—6 of Figure 5.

Referring to Figures 1, 4 and 5 there is shown a base 12 and extending upwardly therefrom a pair of inverted U-shaped parallel spaced housing elements 11.

Antenna supporting shaft 13 extends upwardly from the base 12 and between the housing elements 11 with the lower end of said shaft extending through base 12 and supported upon the bracket 14 and within the bearings 15 carried thereby upon the under side of base 12.

Rotatable shaft 13 extends through the bushing 17 secured within the central supporting plate 16 which is suitably secured to the underside of the horizontal portions of housing elements 11.

Antenna 18 of loop construction has a central downwardly depending collar 19 which fits over the top end of the shaft 13 and is secured thereon as by the set screw 20 for rotation of said antenna in unison with any rotary movements which may be imparted to the shaft 13.

A suitable conductor is indicated by the dotted lines 21 joined at the upper end to the antenna 18 and at the lower end of said conductor being joined to the transverse outwardly extending brush supports 22 from which depend brushes 23.

A split ring 24 is positioned around the shaft 13 directly below the brushes 23 and in engagement therewith for transmitting wave impulses to the leads 25 for controlling the operation of the television receiver in a manner which forms no part of the present invention. It is contemplated that under some conditions the brush support and brushes as well as the split ring may be eliminated, however to avoid too much twisting of the wire 21 it is advisable in some cases to provide the brush arrangement described for transmitting wave impulses to the television receiver.

As shown in Figures 1, 4 and 5 a suitable electric motor 26 is mounted upon the base 12, said motor having a rotatable driving element carrying the pinion gear 27. Said pinion is in mesh at all times with the teeth of the annular ring gear 28 secured to shaft 13 by the pin 29.

Figure 7:
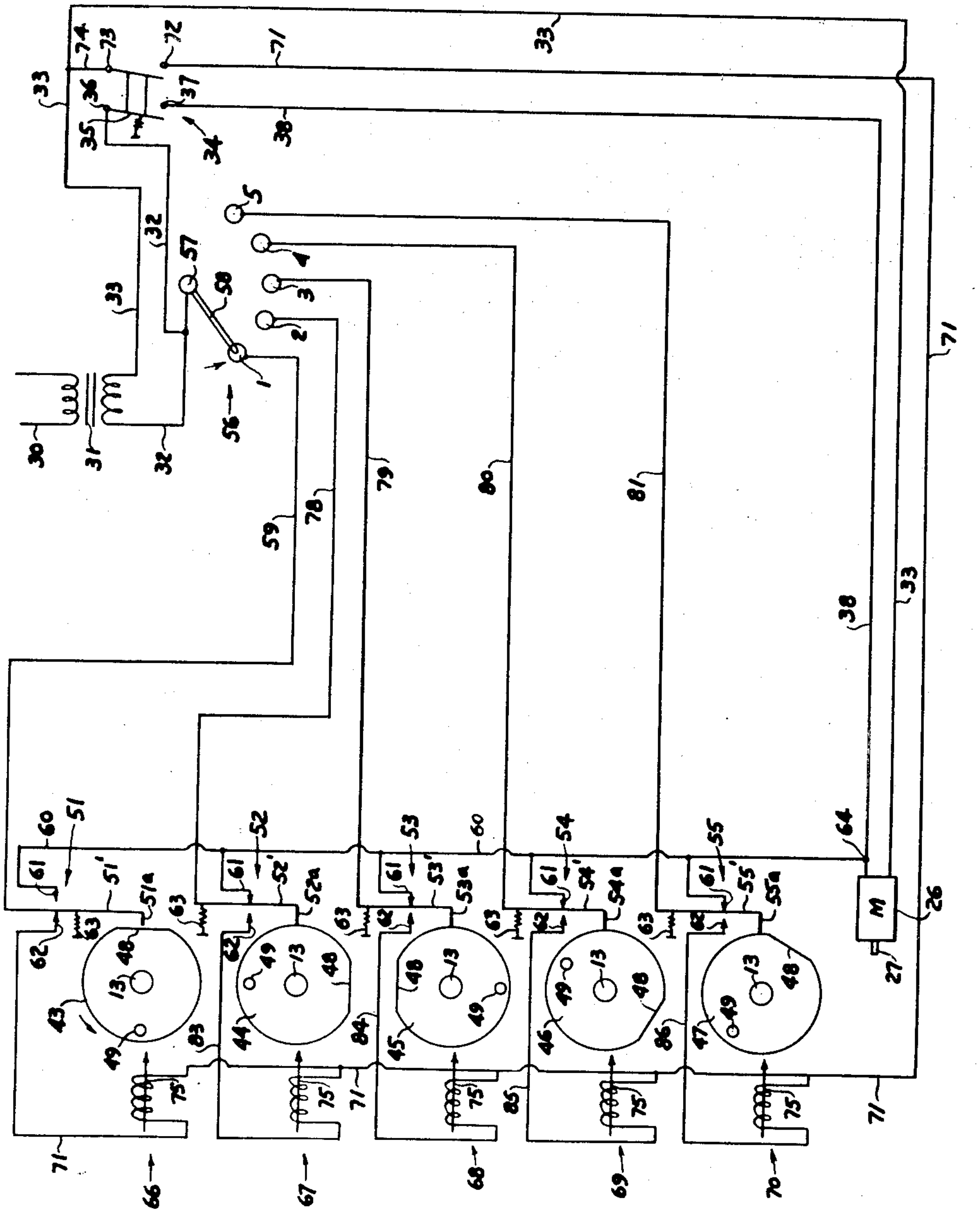
Fig. 7 is a wiring diagram illustrating the various wiring connections between the various parts of the present invention.

Temporarily referring to the wiring diagram set out in Figure 7, a 110 volt source of electrical current is supplied to the wire leads 30. Figure 4 illustrates that the leads 30 may be joined to a suitable source as by the plug 30'. It is contemplated also that this plug may be the same plug which energizes the entire television receiver.

Transformer 31 is provided to step down the voltage in the preferred embodiment to 25 volts transmitted through the wire leads 32 and 33.

Beam setting switch 34 includes the poles 36 and 37 as well as the beam set button or switch arm 35 whereby an electrical circuit may be completed to the electric motor 26 through the lead 38 and the lead 33. It will be noted from Figure 7 that the lead 33 from one side of the low voltage coil of transformer 31 extends directly to motor 26. The circuit is completed by the lead wire 38 from the motor which joins the terminal 37 of switch 34 and when the push button 35 is brought into contact with the terminal connection 37.

By the construction above described it is apparent that the antenna for the television receiver may be manually set for each channel selected and tuned in on the set merely by pressing the switch button 35 and at the same time watching the view screen of the receiver. As soon as the image is the clearest the button 35 may be released to break the circuit to the electric motor 26, and the antenna and its supporting shaft 13 will have been rotated to the proper position for the particular wave channel selected.

When another wave channel is selected as by the usual channel switch on the television receiver, the reception may or may not be sufficiently clear. If it is not, it may be improved merely by again manually pressing the button 35 of the switch 34 energizing motor 26 and causing the antenna 18 to rotate slowly. By watching the view screen the button 35 will be released when the image shows the clearest.

By the above construction it is possible to set the antenna each time a different wave channel is selected merely by pressing the button 35 until the image on the view screen is perfectly clear. But this must be done every time a different channel is selected.

The present invention contemplates going considerably further in providing mechanism whereby the rotation of the electric motor 26 may be preset and automatically determined with means being provided for automatically stopping rotation of the antenna support 13 at the proper moment.

The present invention contemplates a combination of devices and switches whereby the motor will be energized simultaneously with the selection of the desired wave channel through the channel switch 56 shown in Figure 3 hereafter to be described. A plurality of preset cams or discs are radially adjusted in different positions upon the rotatable shaft 13 and are adapted to control certain relay switches in the electrical circuit to the motor 26 so that said circuit will be broken at the proper time depending upon what channel is selected. Assuming there is only one channel, it is seen that with this channel energized in the television set it is possible to rotate the antenna support until the image on the view screen is the clearest. Once this position is established the cam may be so adjusted upon the rotatable shaft that every time the control portion of the cam reaches a predetermined point corresponding to the proper positioning of the antenna, the electric circuit to the driving motor 26 will be broken.

Referring to Figures 1 and 5 it will be noted that there is a plurality of spaced clutch plates 39 positioned upon the shaft 13 and secured thereon as by the transverse pins 40. A yielding friction element such as the leather or other composition discs 42 are also mounted upon the shaft 13 and positioned respectively upon the top surface of each of the clutch plates 39.

Control cams 43, 44, 45, 46 and 47 with central openings therein are loosely positioned over the shaft 13 each respectively bearing against and upon the yielding friction element 42 upon the various clutch plates 39 as shown in Figure 5. Coil springs 41 are mounted around the shaft 13 being respectively interposed between the top surface of one cam and the bottom surface of the adjacent clutch plate. However, the top spring is interposed between bushing 17 and the top surface of the cam 43.

By this arrangement it is seen that through the forces exerted by the springs 41 the cams will be normally retained frictionally with respect to the upright shaft 13 for rotation therewith. However, it will be seen in the manner hereafter described that means may be employed to retain the cams against rotation selectively while the antenna supporting shaft 13 is being power rotated.

Each of the cams have a flat portion or other indentation 48 of reduced diameter for controlling the operation of the contact arm of a relay switch hereafter to be described.

As viewed in Figures 1 and 7 a stop pin 49 is positioned diametrically opposite from the control portions 48 of each of said cams and depends downwardly from each of said cams as illustrated in the drawings.

Relay switch supporting bracket 50 is mounted upon the base 12 and is secured thereto as by the bolts or screws 50'. Relay switches 51, 52, 53, 54 and 55 are vertically arranged with respect to each other and are suitably carried by the bracket 50, with each of said relay switches having a resilient contact arm 51′, 52′, 53′, 54′ and 55′ corresponding to each of the relay switches.

Referring to Figure 7 and Figure 3, there is shown the channel switch generally indicated at 56 which is joined to the lead wire 32 at the terminal 57. Manually rotatable conductor 58 is swivelly joined to the terminal 57 with its outer end being adapted for selective contact with any one of the terminals 1, 2, 3, 4 or 5, shown which correspond to the five channels available in the television receiver, for example. It is contemplated that there may be a lesser or greater number of channels without departing from the present invention. It is sufficient to state however, that the channel switch 56 may be a separate switch or may form a part of the television receiver channel switch for movement in unison therewith.

For illustration with the conductor 58 of channel switch 56 in registry with terminal 1 of the channel switch, electrical power will be transmitted through the wire lead 59 which extends into the relay switch 51 being joined to its contactor 51′. The outer end of said contactor is inturned at 51—*a* with this portion thereof adapted for operative engagement with the surface of rotatable cam 43. Contactor 51′ as well as each of the other contactors of the various relay switches are inherently resilient and tend to stay in contact with the surfaces of the various cams. For purposes of illustration said contactors are shown as biased by the coil springs 63 merely to illustrate that each of said contactors has a tendency to be thrown to the left for engagement with the respective cams.

As shown in Figure 7 each of the relay switches 51, 52, 53, 54 and 55 are joined to the lead wire 60 and one end of said lead wire is joined to the motor 26 through the connection at point 64. Each of the relay switches have a pair of spaced contacts 61 and 62 with each of the respective contacts 61 of said switches being joined to the single lead wire 60.

Consequently if the cam 43 was in any other position from what is shown in Figure 7 the contactor 51′ would be moved into engagement with contact 61 to close the electrical circuit through the antenna shaft rotating motor 26. Said circuit includes the lead wires 32, 59, 60, 33, so that as soon as the channel switch 56 is set with the contact 58 in registry with channel No. 1, cam 43 will be rotated until the contactor 51′ reaches the flat 48 thereon.

Thus, it will be seen that as soon as the channel switch 56 is set for channel No. 1 and this will correspond to the channel 1 of the television receiver, motor 26 will be automatically energized causing the antenna 18 to rotate until contactor 51′ engages the flat 48 of the cam 43.

This condition last mentioned is the one shown in Figure 7 as it is apparent that the connection between contactor 51′ and the contact 61 has been broken thus automatically breaking the electrical circuit which energized motor 26.

Now viewing the screen of the television receiver, the image may or may not be perfectly clear depending upon whether the cam 43 happened to be in the proper radial position with respect to the shaft 13. In all likelihood it would be purely accidental if the device had not been previously set, so that the antenna in all likelihood would not have been stopped at the position which would give maximum clearness of image on the view screen.

Assuming that the image is not perfectly clear, the present invention contemplates automatic mechanism whereby the radial position of said cam may be properly set so that the electric motor 26 will be deenergized at the exact moment that the antenna is in its proper position of adjustment.

To accomplish this a secondary circuit is provided whereby the particular cam may be held against rotation at the same time as the electric motor is energized through the beam set switch 34. Consequently it is seen that in view of the clutch connection between said cams and the shaft 13, the shaft 13 may be rotated by the motor 26 with said cams being retained against rotation as by the downwardly projecting pins 49 which will register with a solenoid shaft 75 in the manner hereafter described. It will be understood that the present invention contemplates that there is one relay switch for each channel, one control cam for each relay switch, and one solenoid for each cam. Furthermore it is contemplated that the cams be set one at a time, with cam 44 being set when channel 2 is selected, cam 45 for channel 3, cam 46 for channel 4 and cam 47 for channel 5.

Referring to Figures 1 and 4, bracket 65 is mounted upon the base 12 and suitably secured thereto as by the bolts or screws 65′. A plurality of solenoids are vertically arranged in stacked relation, i. e. solenoids 66, 67, 68, 69 and 70, suitably secured to the bracket 65. Each of said solenoids includes the shaft 75 to which is secured a disc 76, there being a coil spring 77 normally urging the shaft 75 to the inoperative position shown in Figure 1. When anyone of said solenoids is energized in the manner hereafter described, the shaft 75 will be projected to the right lying directly in the path of the corresponding pin 49 which projects from the corresponding cam to be set with respect to the shaft 13. Said pins are substantially opposite from the flats 48 of the cams as shown in Figure 1 with said flats being in registry with the contactor such as the contactor 51′ of the relay switch 51. It will be remembered that when the channel No. 1 was initially energized by the channel switch 56, the cam 43 was rotated by the motor 26 to the position shown until the circuit was broken to said motor by the positioning of the flat 48 adjacent said contactor.

In this position the depending pin 49 of the cam 43 is adjacent the solenoid shaft 75 so that when that solenoid is energized further rotation temporarily of the cam 43 will be prevented.

Again referring to cam 43 by virtue of its present position contactor 51′ is now in engagement with the other contact 62 of the relay switch, the latter being joined by the wire lead 71.

As shown in Figure 7 the lead 71 is arranged in series with the coil of solenoid 66 said lead continuing downwardly in Figure 7 and returning to the terminal 72 of the beam set switch 34. As it is apparent that the control button 35 of said switch is normally open, the circuit through the solenoid is open with result that said solenoid will not be energized until push button 35 is pressed to complete the circuit through terminal 73 and the lead 74 which joins the main power lead 33.

It will be noted that the aforementioned circuit includes the channel switch 56 which has been manually set to engage the terminal corresponding to channel No. 1. Returning to the original assumption that when the cam 43 initially stopped in view of its positioning as shown in Figure 7, and further that the image on the view screen was not clear, it is then necessary to manually operate the beam set button 35 of switch 34 which will not only energize the solenoid 66 but will simultaneously energize the electric motor 26 in the manner hereinabove fully described.

When the shaft 75 of solenoid 66 is projected to the right, it will register with the pin 49 to prevent rotation of the cam 43. Furthermore, simultaneously with the energizing of said solenoid the electrical circuit to motor 26 is closed through the leads 32, 35, 37, 38, 33.

At the same time the circuit through the solenoid includes the interconnected wire leads 32, 58, 59, 62, 71, 72, 73, 74, 33. Now, the push button 35 is manually depressed until the image on the view screen is the clearest at which time the button 35 is released deenergizing motor 26 as well as the particular solenoid 66 with result that its shaft 75 is resiliently returned to the inoperative position shown in Figure 1.

Now it is clear that cam 43 has been rotatably reset with respect to rotatable antenna supporting shaft 13. As reset the flat 48 of said cam is in registry with the contactor 51′ of the relay switch 51, so that every time said cam reaches the position shown in Figure 7 the motor 26 will be deenergized automatically. The proper relationship between the cam 43 and the shaft 13 has now been established and in view of the springs 41, the clutch plate 39 and the friction element 42, said cam will be effectively retained with respect to the shaft 13 for rotation in unison at all times. The position of the cam 43 as now set corresponds to the position of the antenna which gives the best image on the view screen for channel No. 1 of the television receiver.

In the manner fully described for obtaining the proper setting of cam 43 so that whenever channel switch 56 is set for channel No. 1 the image will be correct due to the proper positioning of the antenna, each of the other cams 44, 45, 46 and 47 may be also set one at a time.

For this purpose the respective terminals 2, 3, 4 and 5 of the channel switch 56 are connected to the respective contactors 52′, 53′, 54′ and 55′ of the relay switches 52, 53, 54 and 55 by the lead wires 78, 79, 80 and 81.

Thus it will be seen that if the arm 58 of the channel switch is brought into registry with terminal No. 2 corresponding to channel No. 2, the electric motor 26 will be energized through the circuit 78, 61, 60, 26, 33, 32, 57 and 58.

Shaft 13 will be rotated until the flat 48 of cam 44 engages the contactor 52′ of relay switch 52, at which time the circuit to the motor 26 is broken, and contactor 52′ engages the contact 62 of the lead wire 83 which is joined to the coil of solenoid 67.

It follows furthermore that in the separate case of each of the cams 45, 46 and 47 that each will stop rotating when separately tested when the flat 48 of said cam engages the respective contactor of the relay switch 53, 54, or 55 depending upon how the channel switch 56 has been set.

To properly set cam 44 it is now necessary to push the button 35 of the beam set switch 34 which will energize the solenoid 67 to prevent rotation of the particular cam and at the same time energize the motor 26 to cause rotation of the shaft 13 while the cam 44 is retained against rotation.

As fully described above the button 35 will be held down until the image on the view screen is perfectly clear at which time the button is released opening the circuit to the motor as well as to the particular solenoid 67. Now, cam 44 has been properly set and thereafter when channel No. 2 is energized said cam as well as shaft 13 and the antenna 18 thereon will be automatically rotated and stopped at the proper position to assure that for the setting of channel No. 2 the image on the view screen will be the clearest.

Referring to Figure 7 there is shown a lead 84 which interconnects contact 62 of relay 53 and the coil of solenoid 68. Lead 85 interconnects contact 62 of relay 54 and the coil of solenoid 69; and lead 86 interconnects the contact 62 of relay switch 55 and the coil of solenoid 70.

Thus Figure 7 properly illustrates the various circuits required for initially rotating the shaft 13 for obtaining the independent setting of the various channels 1, 2, 3, 4 or 5. Once these cams have been properly set relative to the supporting shaft 13 there is no further need for the beam set switch 34.

Thereafter everything is automatic for as soon as a particular channel is selected by the channel switch 56, the antenna supporting shaft 13 will be automatically rotated the proper amount.

Element 82 upon the base of the device represents a terminal block for the juncture of the various electrical leads employed interconnecting the source of electrical energy, the channel switch, the beam setting switch, the electric motor, the relay switches as well as the solenoids.

Having described my invention, reference should now be had to the claims which follow for determining the scope thereof.

I claim:

1. In combination, a base, an upright shaft rotatably journalled thereon, a transverse antenna secured to said shaft, a motor on said base connected to said shaft to effect rotation thereof, a switch for said motor, a clutch plate secured to said shaft, a cam loosely positioned upon said shaft permitting rotating adjustments with respect thereto, friction means retainingly positioning said cam relative to said clutch plate for movement in unison, an electrical circuit between said switch and said motor, and a relay switch in said circuit having a contactor engageable with said cam for breaking the circuit when said cam has rotated to a predetermined position.

2. In combination, a base, an upright shaft rotatably journalled thereon, a transverse antenna secured to said shaft, a motor on said base connected to said shaft to effect rotation thereof, a switch for said motor, a clutch plate secured to said shaft, a friction disc on said shaft operatively engaging the surface of said plate, a cam loosely positioned upon said shaft in surface engagement with said friction disc permitting rotating adjustment of said cam with respect to said shaft, a spring bearing on said cam, an electrical circuit between said switch and said motor, and a relay switch in said circuit having a contactor engageable with said cam for breaking the circuit when said cam has rotated to a predetermined position.

3. In combination a base, an upright shaft rotatably journalled thereon, a transverse antenna secured to said shaft, a motor on said base connected to said shaft to effect rotation thereof, a switch for said motor, a cam rotatably adjusted and loosely positioned and retained upon said shaft, reciprocal means retainingly engageable with said cam to prevent rotation thereof, whereby said shaft may be rotatably adjusted with respect to said cam.

4. In combination a base, an upright shaft rotatably journalled thereon, a transverse antenna secured to said shaft, a motor on said base connected to said shaft to effect rotation thereof, a switch for said motor, a cam rotatably adjusted and loosely positioned and retained upon said shaft, reciprocal means retainingly engageable with said cam to prevent rotation thereof, whereby said shaft may be rotatably adjusted with respect to said cam, and means disengaging said reciprocal means from said cam whereby said cam in its adjusted position is retained relatively to said shaft for movement therewith.

5. In combination, a base, an upright shaft rotatably journalled thereon, a transverse antenna secured to said shaft, a motor on said base connected to said shaft to effect rotation thereof, a switch for said motor, a cam loosely positioned and retained upon said shaft, solenoid operated reciprocal means retainingly engageable with said cam to prevent rotation thereof, whereby said shaft may be rotatably adjusted with respect to said cam.

6. In combination, a base, an upright shaft rotatably journalled thereon, a transverse antenna secured to said shaft, a motor on said base connected to said shaft to effect rotation thereof, a switch for said motor, a cam rotatably adjusted and loosely positioned and retained upon said shaft, solenoid operated reciprocal means retainingly engageable with said cam to prevent rotation thereof, whereby said shaft may be rotatably adjusted with respect to said cam, a second switch, electrical connections between said solenoid operated means, said motor and said second switch whereby said motor may be energized independent of said first switch.

7. In combination, a base, an upright shaft rotatably journalled thereon, a transverse antenna secured thereto, a motor on said base, means interconnecting said motor and said shaft to effect rotation thereof, a switch for said motor, a cam rotatably adjusted with respect to and retained upon said shaft, an electrical circuit between said switch and said motor, and a relay switch in said circuit having a contactor engageable with said cam for breaking the circuit when said cam has rotated to a predetermined position, solenoid operated reciprocal means retainingly engageable with said cam to prevent rotation thereof, whereby said shaft may be rotatably adjusted with respect to said cam, a second switch, and a second electrical circuit between said solenoid operated means, said motor and said second switch, whereby said motor and said solenoid operated means may be energized independent of said first switch.

8. In combination, a base, an upright shaft rotatably journalled thereon, a transverse antenna secured to said shaft, a motor on said base, means interconnecting said motor and said shaft to effect rotation thereof, a switch for said motor, a cam rotatably adjusted with respect to and retained upon said shaft, an electrical circuit between said switch and said motor, a relay switch in said circuit having a contactor engageable with said cam for breaking the circuit when said cam has rotated to a predetermined position, solenoid operated reciprocal means retainingly engageable with said cam to prevent rotation thereof, whereby said shaft may be rotatably adjusted with respect to said cam, a second electrical circuit between said motor, said solenoid operated means and said relay switch, and a second switch in said latter circuit effective when said first circuit is deenergized to cause rotation of said shaft and antenna relative to said cam establishing an adjusted radial relation between said shaft and said cam.

9. In combination a base, a shaft rotatably journalled thereon, a transverse antenna secured to said shaft, a motor on said base connected to said shaft to effect rotation thereof, a switch for said motor, a cam rotatably adjusted with respect to and retained upon said shaft, an electrical circuit between said switch and said motor, a second electrical circuit, a relay switch interposed in said circuits and having a contactor engageable with said cam, said contactor normally maintaining electrical connection with said first circuit, said cam being adapted for breaking this connection whereby electrical connection is established with said second circuit, when said cam has rotated to a predetermined position, solenoid operated reciprocal means retainingly engageable with said cam to prevent rotation thereof whereby said shaft may be rotatably adjusted with respect to said cam, said solenoid operated means and said motor being connected in said second circuit, and a second switch in said latter circuit effective when said first circuit is deenergized by said cam to cause rotation of said shaft and antenna relative to said cam establishing an adjusted relation between said shaft and said cam.

HERBERT WEINGARDEN.

REFERENCES CITED

The following references are of record in the file of this patent:

UNITED STATES PATENTS

| Number | Name | Date |
|---|---|---|
| 2,264,850 | Koch | Dec. 2, 1941 |
| 2,272,431 | Rankin | Feb. 10, 1942 |
| 2,292,791 | Mims | Aug. 11, 1942 |
| 2,481,331 | Newbold | Sept. 6, 1949 |